United States Patent [19]

Haines

[11] Patent Number: 4,506,476

[45] Date of Patent: Mar. 26, 1985

[54] VEHICULAR BLINDS

[76] Inventor: Richard K. Haines, P.O. Box 2177, Elkhart, Ind. 46514

[21] Appl. No.: 498,927

[22] Filed: May 27, 1983

[51] Int. Cl.³ ............................................. E05B 7/08
[52] U.S. Cl. .......................................... 49/64; 49/74
[58] Field of Search .................. 49/64, 87, 89, 74, 64, 49/51, 403; 160/178

[56] References Cited

U.S. PATENT DOCUMENTS

| 2,393,819 | 1/1946 | Smith et al. | 160/178 R |
| 2,485,263 | 10/1949 | Digby | 49/87 |
| 2,693,010 | 11/1954 | Anderson | 49/64 X |

FOREIGN PATENT DOCUMENTS

742840  1/1956  United Kingdom ................... 49/64

Primary Examiner—Kenneth Downey
Attorney, Agent, or Firm—Trexler, Bushnell & Wolters, Ltd.

[57] ABSTRACT

A window blind, preferably used with van windows, is disclosed. The window blind comprises a plurality of slats, and first and second framework members. The first and second framework members are virtually identical and only the first will now be described. The first framework member includes a first and a second sidepiece, and a plurality of struts. Each one of the struts is pivotally connected at one end portion thereof to the first sidepiece, and is pivotally connected at an opposite end portion thereof to the second sidepiece. Each strut is longitudinally spaced from an adjacent strut. Each one of the struts includes means such as indented portions thereof for securing an edge portion of one of the slats thereto. The first sidepiece preferably includes opposite end portions engageable with the window for fixing the first sidepiece of the framework member to the window.

7 Claims, 30 Drawing Figures

VEHICULAR BLINDS

BACKGROUND OF THE INVENTION

This invention is directed to a novel window blind. More particularly, this invention is directed to a novel window blind for vehicles, such as vans and the like.

Some window blinds for vehicles (such as vans, for example) are a type of venetian blind; i.e., such window blinds tend to be made of a number of relatively thin wooden or metal slats which can be set together at any angle for regulating the passage of light or air therethrough. Some of these types of vehicular window blinds are not rigid and are generally secured to the window along an upper edge portion thereof. Such window blinds usually also have depending or hanging portions (of flexible plastic or fabric) which occasionally tend to strike the window upon rapid acceleration or deceleration of the vehicle. Such striking of the blind, at times, can be distracting to the driver of the vehicle.

OBJECTS AND SUMMARY OF THE INVENTION

Accordingly, it is a general object of this invention to provide a novel and improved window blind.

A further object is to provide such a blind which is securable to a window of a vehicle, such as a van.

Yet another object is to provide such a blind, a portion of which is mountable upon such a window in fixed relation thereto.

Briefly, and in accordance with the foregoing objects, the window blind of the instant invention will now be summarized. Although preferably used with van windows, it will be appreciated that the present invention can be used with a variety of other windows. The window blind comprises a plurality of slats, and first and second framework members. The first and second framework members are virtually identical and only the first will now be summarized. The first framework member includes a first and a second sidepiece, and a plurality of struts. Each one of the struts is pivotally connected at one end portion thereof to the first sidepiece, and is pivotally connected at an opposite end portion thereof to the second sidepiece. Each strut is longitudinally spaced from an adjacent strut. Each strut includes means such as indented portions thereof for securing an edge portion of one of the slats thereto. The first sidepiece preferably includes opposite end portions engageable with the window for fixing the first sidepiece of the framework member to the window.

BRIEF DESCRIPTION OF THE DRAWINGS

The foregoing, as well as other objects, features or advantages of the present invention will become more readily understood upon reading the following detailed description of the illustrated embodiment, together with reference to the drawings, wherein.

DETAILED DESCRIPTION OF THE ILLUSTRATED EMBODIMENTS

Figure 21:
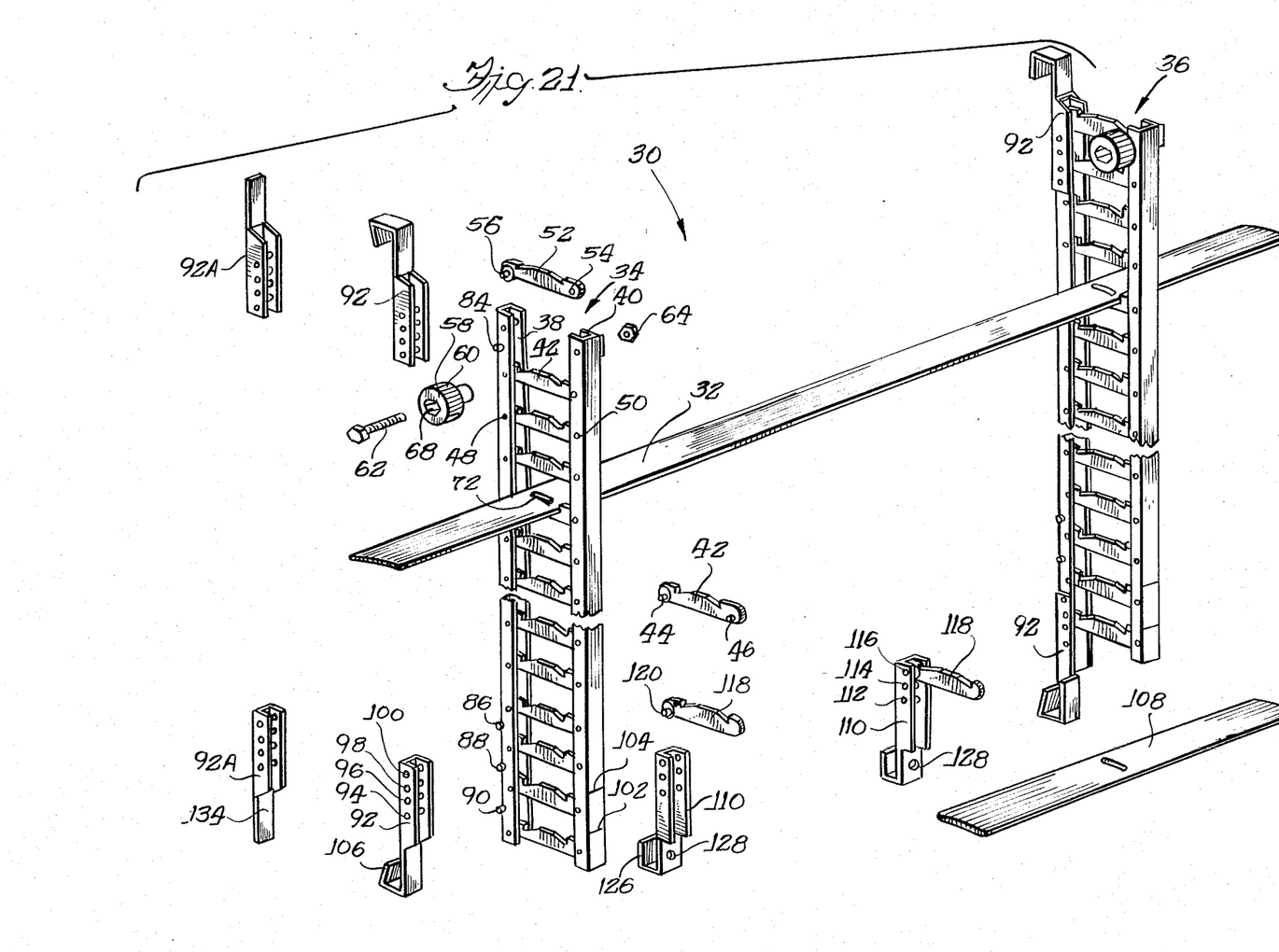
FIG. 21 is a partially fragmented and exploded isometric view illustrating several embodiments of the present invention.

Referring initially to FIG. 21, the window blind 30 comprises a plurality of slats 32, and first and second frameworks 34, 36. The first and second frameworks 34, 36 preferably are virtually identical and only the first framework 34 will now be described in greater detail.

The first framework 34 includes a first sidepiece 38, a second sidepiece 40 and a plurality of crosspieces or struts 42. Each one of the struts 42 is pivotally connected at one end portion thereof to the first sidepiece 38, and is pivotally connected at an opposite end portion thereof to the second sidepiece 40 (see FIGS. 4, 21 and 26). The sidepieces 38, 40 and strut 42 are preferably rigid. Longitudinally along the first and second sidepieces 38, 40, each one of the struts 42 is spaced from an adjacent strut 42, by a feature of the window blind 30 which will be described below in greater detail.

Figure 7:
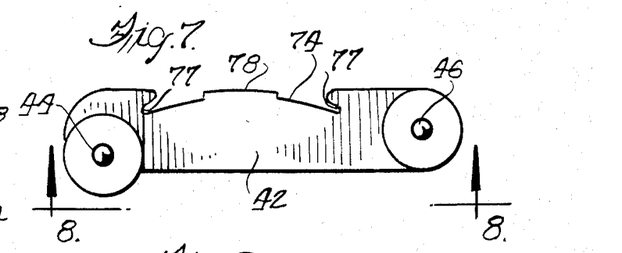
FIG. 7 is a side view of one form of the plurality of struts on an enlarged scale relative to FIGS. 1 and 2.
Figure 8:
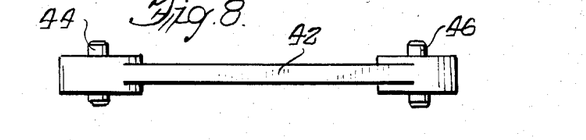
FIG. 8 is a bottom view taken along the lines 8—8 in FIG. 7.

Each strut 42 is preferably elongated (FIG. 8) and includes two pairs of integral pins 44, 46, preferably circular in cross section, at opposite ends thereof (FIGS. 7, 8). As to the first pair of pins 44, one pin 44 is on one lateral side of one end portion of the strut 42, and the other pin 44 is on the opposite lateral side of such strut end portion (FIG. 8). The second pair of pins 46 is similarly positioned on the opposed lateral sides of the opposite end portion of the strut 42.

The first and second sidepieces 38, 40 are preferably U-shaped in cross section (FIG. 6) for receiving an end portion of the crosspiece or strut 42 (FIGS. 7, 8). The first and second sidepieces 38, 40 respectively include a plurality of pairs of longitudinally spaced through apertures 48, 50 (FIG. 21), preferably circular in cross section (FIGS. 5, 6), into which the first or second pairs of pins 44 or 46 are insertable (FIGS. 4, 19, 20, 21 and 26).

Figure 4:
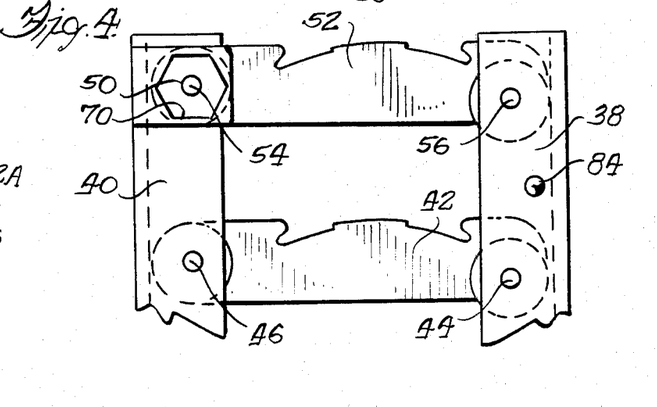
FIG. 4 is a side view illustrating detail of a first or upper end portion of a framework member of the present invention, on an enlarged scale relative to FIGS. 1 and 2.

An additional or uppermost strut 52 (FIGS. 4, 19 and 20) preferably includes a through aperture 54 (FIG. 9), preferably circular in cross section, through one end portion thereof. The uppermost strut 52 further includes an integral pair of pins 56, preferably circular in cross section, at the opposite end portion thereof. The pins 56 are located on opposite lateral sides of such end portion much the same as the pins 44 or 46 in relation to the opposite lateral sides of the end portions of the strut 42 (FIG. 8). The longitudinal distance between the aperture 54 and pins 56 of the uppermost strut 52 is about the same as the longitudinal distance between the pins 44 and 46 of the strut 42 so that the strut 52 can be substituted for any one of the plurality of struts 42 in either framework 34 or 36, if such is desired. The additional or uppermost strut 52 is preferably substituted for one of the plurality of struts 42 at the top portion of the framework 34 or 36 (FIGS. 4 and 21).

Figure 28:
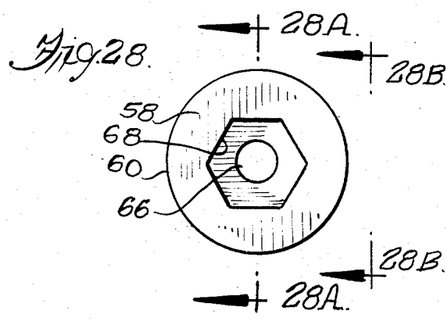
FIG. 28 is a frontal view of a knob, on an enlarged scale, preferably used in combination with the framework members.
Figure 28A:
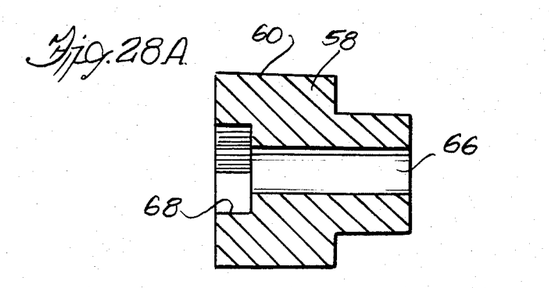
FIG. 28A is a sectional view taken along the lines 28A—28A in FIG. 28.
Figure 28B:
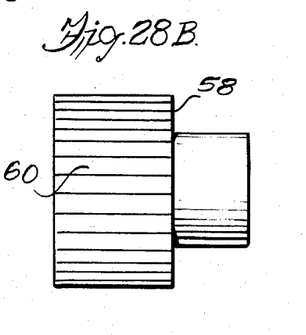
FIG. 28B is a side view taken along the lines 28B—28B in FIG. 28.

For imposing variable resistance to longitudinal movement of one sidepiece 38 or 40 relative to the other sidepiece, each framework 34 and 36 further includes a knob 58 (FIGS. 21, 28, 28A and 28B), preferably circular in cross section (FIG. 28), having a knurled outer periphery 60 (FIGS. 21, 28B), preferably engageable by a thumb and forefinger. The knob 58 is secured to the framework 34 or 36 by a bolt 62 and nut 64 (FIG. 21) in a manner which is described below in greater detail. The knob 58 includes a through aperture 66 (FIGS. 28, 28A), transversely disposed to the knurled periphery 60, through which a threaded portion of the bolt 62 is insertable (FIG. 21). The knob 58 also preferably includes a knob cavity 68 (FIGS. 28, 28A) communicating with the through aperture 66. The cavity 68 is formed in the knob 58 to receive and engage a head portion of the bolt 62 (FIG. 21) so that angular rotation of the knob 58 about the longitudinal axis of the bolt 62 causes the bolt 62 to rotate about its longitudinal axis. The respective through apertures 48, 50 of the first and second sidepieces 38, 40 are sufficiently large in cross section for receiving the threaded end of the bolt 62.

With lateral sides of the bolt head engaging opposed sides of the knob cavity 68 and with the threaded portion of the bolt 62 inserted through the knob aperture 66, the bolt 62 preferably has a length such that the remainder of the bolt 62 is insertable through one of the pairs of apertures 50. Bolts 62 are preferably respectively inserted through an exterior side of the uppermost pair of apertures 50 of the second sidepiece 40 of the first framework 34, and through an interior side of these apertures 50 of the second framework 36 (FIG. 21). Moreover, with the pins 56 of the uppermost strut 52 (FIG. 9) engaging the uppermost pair of apertures 48 of the first sidepiece 38 (FIG. 4), the through aperture 54 of the uppermost strut 52 is alignable with the uppermost pair of apertures 50 of the second sidepiece 40. The aperture 54 of the uppermost strut 52 is sufficiently large for passing the threaded portion of the bolt 62 therethrough.

The inwardly-directed side of the second sidepiece 40 (the side opposite the knob 58), moreover, preferably includes an integral cavity 70 (FIG. 4) communicating with the aperture 50 through such side of the sidepiece 40 for receiving and engaging the nut 64 and preventing rotation of the nut 64 relative to the second sidepiece 40 when the knob 58 is rotated (as above described) causing the head of the bolt 62 and nut 64 to be drawn together or spaced apart.

Figures 24, 25, 26, 27:
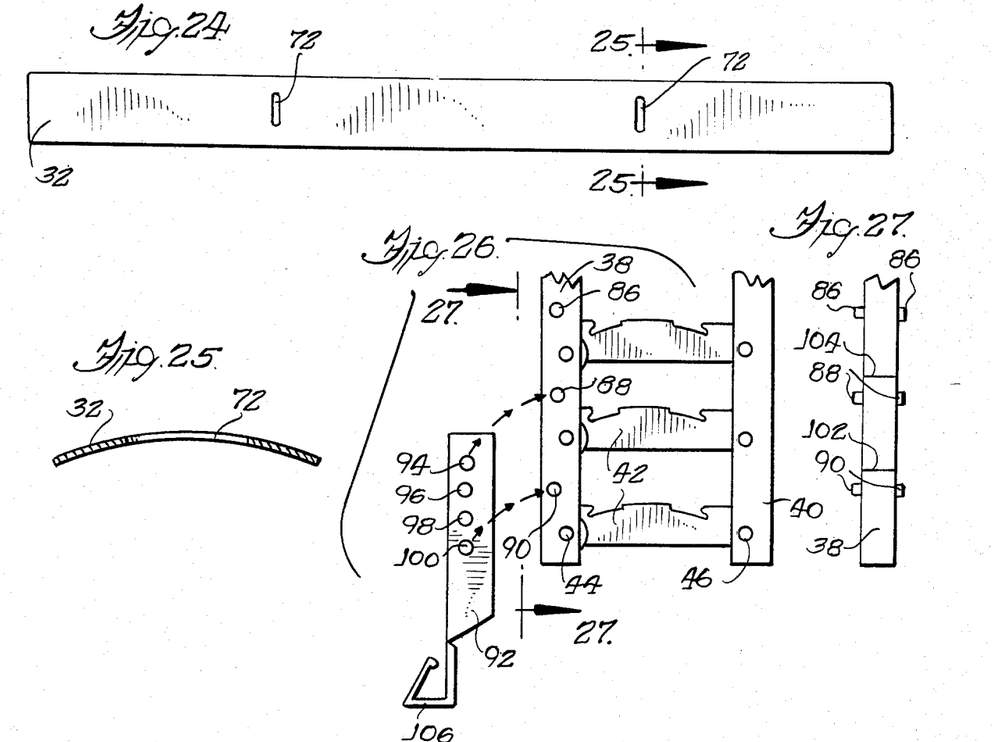
FIG. 24 is a top view of a first embodiment of a preferred slat.
FIG. 25 is a sectional view, on an enlarged scale, taken along the line 25—25 in FIG. 24.
FIG. 26 is a side view of a second or lower end portion of the framework member presented in FIG. 4 (on a reduced scale), FIG. 26 further including a side view of the endpiece presented in FIG. 11 (also on a reduced scale)
FIG. 27 is an edge view, taken along the lines 27—27, of the framework member presented in FIG. 26.

There are preferably 24 slats 32, each such slat 32 being longitudinally spaced from an adjacent slat 32 along the first or second framework 34 or 36. Each slat 32 is preferably an elongated member (FIG. 24) relatively thin and preferably arcuate in cross section (FIG. 25). An individual slat 32 is preferably arranged on the first and second frameworks 34, 36 so that an upper surface of such slat 32 is convex. Each slat 32 preferably includes two elongated slits 72 (FIG. 24) longitudinally spaced at opposite end portions of the slat 32 and oriented preferably transverse to the elongated slat 32.

Figures 17, 19, 20, 22, 23:
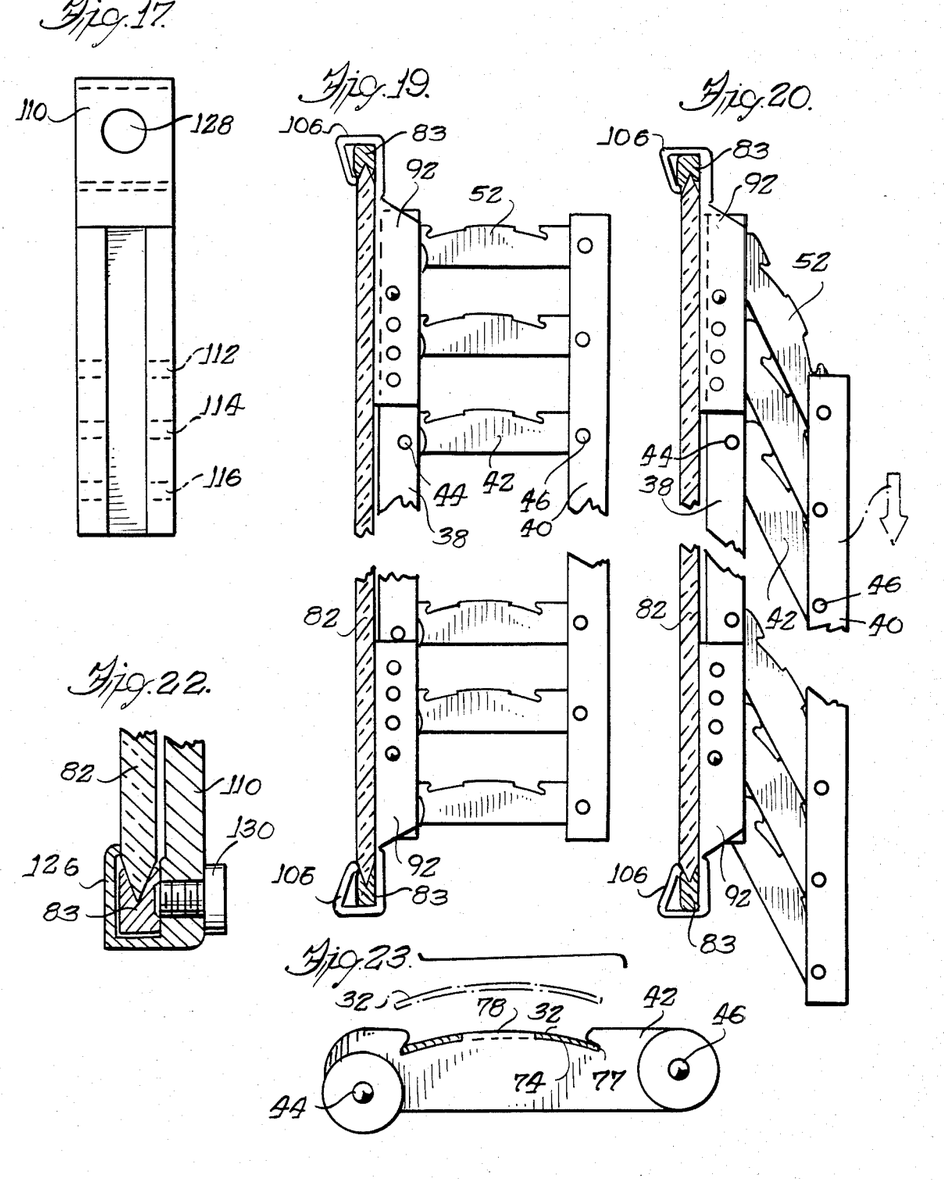
FIG. 17 is a frontal view taken along the lines 17—17 in FIG. 15.
FIG. 19 is a side view of the window blind and window presented in FIG. 1, the struts of the window blind being in a first or open position.
FIG. 20 is a side view of the present invention, the struts having been moved to a second or closed position.
FIG. 22 is a partial side view (on an enlarged scale), in section, presenting one preferred manner of securing the embodiment presented in FIG. 1 to the window.
FIG. 23 is a projected on-edge view presenting preferred engagement of a strut by a slat.

Respective upper edge portions 74, 76 of the struts 42, 52 (FIGS. 7, 9), which engage the slat 32, are preferably arcuate and have a curvature complementary to the concave curvature of the underside of the slat 32 (FIG. 23). The respective upper edge portions 74, 76 (FIGS. 7, 9) of the struts 42, 52 further preferably include integral embossments 78, 80, engageable with individual slits 72, for preventing longitudinal movement of a slat 32 relative to a strut 42 or 52. Moreover, opposite ends of the respective upper edge portions 74, 76 of the struts 42, 52 further preferably include indents 77, 79 (FIGS. 7, 9) for engaging opposite edge portions of individual slats 32 (FIG. 23).

It can be appreciated that the spacing between the slits 72 of the slats 32, and that the length of each one of the plurality of slats 32, can be varied for producing window blinds 30 of varying widths.

When viewed on edge, it can be appreciated that the above-described elements of the window blind 30, when assembled, form a pivotable network. For example, the struts 42, 52 and at least one of the sidepieces 38, 40 are longitudinally pivotable relative to the other sidepieces (FIGS. 19, 20) for opening or closing the slats 32.

Figure 1:
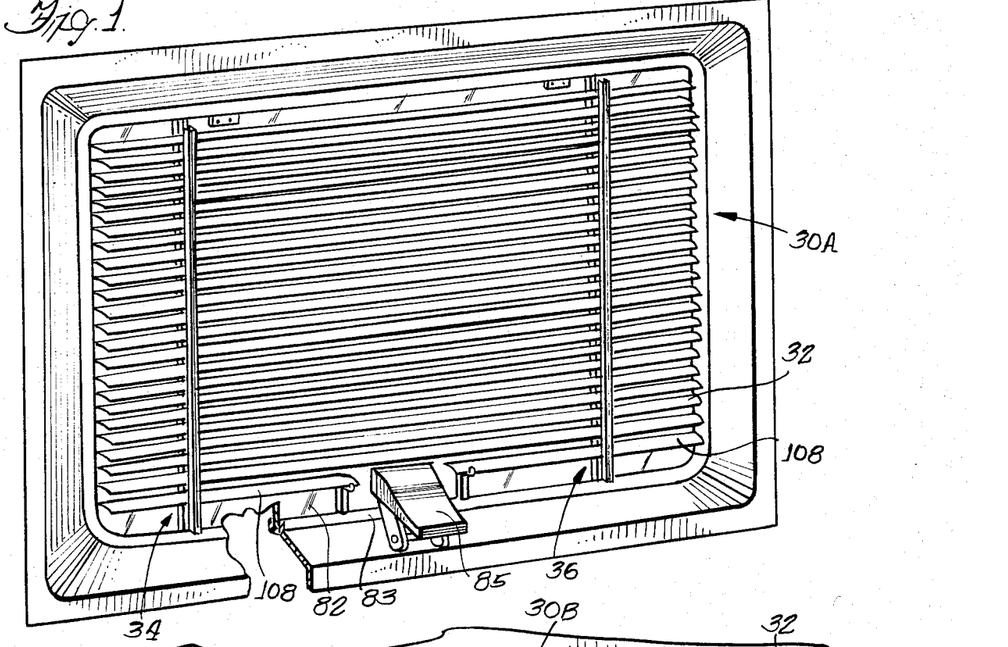
FIG. 1 is an isometric view of one embodiment of the window blind of the present invention secured to one type of a vehicular window.

A first preferred embodiment of the window blind 30A is presented in FIG. 1. A second preferred embodiment of the window blind 30B is presented in FIG. 2.

The first embodiment of the window blind 30A is shown fixed to a swing-out or pivotable window 82 (FIGS. 1, 22) of a van by a feature of the invention which will now be discussed. The window 82 is shown including a molding 83 (usually rolled metal) around the perimeter thereof. The window 82 is further shown including a latch 85 along a lower edge portion thereof for releasing the window 82 from the body of the vehicle, permitting the window 82 to be moved relative to the vehicle body, for securing the window blind 30A to the window 82.

Figures 5, 6:
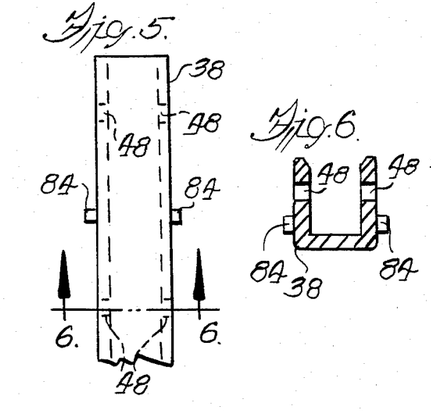
FIG. 5 is an edge view of a first or upper end portion of one of the two sidepieces, on an enlarged scale relative to FIGS. 1 and 2.
FIG. 6 is a sectional view taken along the lines 6—6 in FIG. 5.

The upper end portion of the first sidepiece 38 includes a pair of integral pins 84 disposed on opposite lateral sides thereof (FIGS. 4, 5 and 6). The lower end portion of the first sidepiece 38 includes a plurality of (preferably 3) pairs of integral pins 86, 88 and 90, individual pins of each such pair 86, 88 and 90 also being disposed on opposite lateral sides of the first sidepiece 38 (FIGS. 26, 27). Along a lateral side, each lower integral pin 86, 88 and 90 is preferably equally longitudinally spaced from an adjacent pin.

Figures 9, 10, 11, 12, 13, 14, 15, 16:
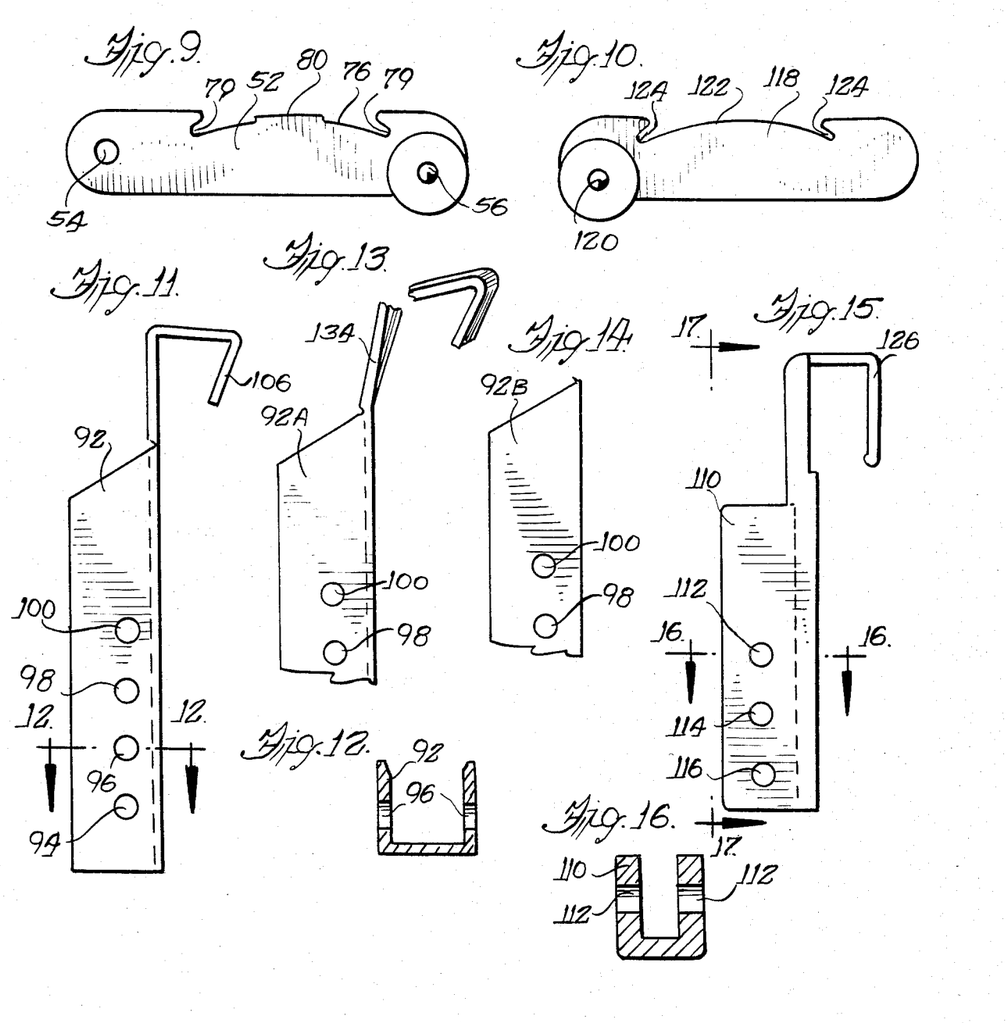
FIG. 9 is a side view of a preferred uppermost strut, on an enlarged scale relative to FIGS. 1 and 2.
FIG. 10 is a side view of an arm preferably used in combination with the embodiment presented in FIG. 1, on an enlarged scale relative thereto.
FIG. 11 is a side view of an endpiece variably securable preferably to either one of the opposite end portions of the sidepiece partially presented in FIG. 5, FIG. 11 being presented on a scale different from that of FIG. 5 and on an enlarged scale relative to FIG. 1.
FIG. 12 is a sectional view taken along the lines 12—12 in FIG. 11.
FIG. 13 is a side view of the endpiece presented in FIG. 11, illustrating a feature of the present invention which will be described below in greater detail.
FIG. 14 is a side view of the endpiece presented in FIG. 11, illustrating yet another feature of the present invention which also will be described below in greater detail.
FIG. 15 is a side view of a support, preferably used in combination with the embodiment presented in FIG. 1 and on an enlarged scale relative thereto.
FIG. 16 is a sectional view taken along the lines 16—16 in FIG. 15.

An endpiece 92 (FIG. 11) is securable to either the upper or the lower end portion of the first sidepiece 38. The endpiece 92 is U-shaped in cross section (FIG. 12), is preferably elongated, and includes a plurality of (preferably 4) pairs of through apertures 94, 96, 98 and 100, preferably circular in cross section, through the sidewall of the endpiece 92 (FIGS. 11, 26). Along a sidewall portion, each such aperture 94, 96, 98 and 100 is preferably equally longitudinally spaced from an adjacent aperture. Sidewalls of the endpiece 92 are sufficiently spaced, one from the other (FIG. 12), for engaging lateral sides of the first framework 38 (FIGS 5, 27) therebetween. The apertures 94, 96, 98 and 100 (FIGS. 11, 26) are sufficiently large for receiving either the upper pins 84 (FIG. 5) or the lower pins 86, 88 or 90 (FIGS. 26, 27) of the first sidepiece 38. Moreover, the apertures 94, 96, 98 and 100 of the endpiece 92 are preferably longitudinally spaced, one aperture from the other, such that end apertures 94 and 100 are engageable with adjacent pins, such as, pins 88 and 90, for example (FIG. 26).

It has been noted that height dimensions of windows vary somewhat from one van manufacturer to another. The exterior surfaces of the first (FIG. 27) and second sidepieces 38 and 40, accordingly, include score lines 102, 104.

The length of the first or second workpiece 38 or 40 is such that the first embodiment of the window blind 30A (FIG. 1) is securable to a first commonly-purchased van in a manner which will be described more fully below. However, the first and second sidepieces 38, 40 can be cut (such as, for example, by a hacksaw) along the score line 102 and, once cut, can have a length such that the window blind 30A is securable to a second commonly-purchased van. In like manner, the first and second sidepieces 38, 40 can be cut along the score line 104 rendering the window blind 30A securable to a third commonly-purchased van. It can be appreciated that the first and second sidepieces 38 and 40 can generally be cut anywhere along the entire length thereof so as to render the window blind 30A securable to any one particular van window. If the first and second sidepieces 38, 40 must be reduced in length to where the lower pins 86, 88 and 90 are removed from the first sidepiece 38, then it is suggested that a pair of through bores be formed through the sidewalls of the first sidepiece 38, preferably intermediate adjacent apertures 48, for securing the endpiece 92 to the first sidepiece 38 (in a known manner, such as with a threaded fastener).

The endpiece 92 includes an integral, hooked portion 106 (FIGS. 11, 26) engageable with the molding 83 of the window 82 (FIGS. 19 and 20). Hooked portions 106 of a pair of endpieces 92 are vertically aligned, one to the other, and preferably respectively snugly engage with an upper and a lower portion of the molding 83. The first sidepiece 38, when used in combination with the endpieces 92, has a length so as to provide snug engagement of the first sidepiece 38 with the window 82, and the second sidepiece 40 preferably has a length about the same as the length of the first sidepiece 38. The first sidepiece 38 is snap engageable with the endpiece 92. For example, the upper pins 84 or the lower pins 90 are snap engageable into the apertures 96 (FIGS. 21, 26).

As an added feature, there are preferably two lowermost slats 108 (FIGS. 1, 21), each one of such slats 108 being positioned on a respective side of the latch 85.

An elongated support 110 includes a plurality of (preferably 3) pairs of through apertures 112, 114 and 116 through opposed sidewalls thereof (FIGS. 15 and 17). Along a sidewall, each aperture 112, 114 and 116 is preferably equally longitudinally spaced from an adjacent aperture. An elongated arm 118 (FIGS. 10, 21) has a pair of oppositely-disposed integral pins 120 along one end portion thereof. Each such pin 120 extends from a respective lateral side of the arm 118, in much the same way as do the pins 44 or 46 from the strut 42 (FIG. 8). Also, the arm 118 has an upper surface 122 (FIG. 10) for supporting the slat 108. The upper surface 122 is preferably complimentary to the curvature of the underside of the slat 108. The slat 108 preferably has a curvature the same as that for the slat 32 (FIG. 25). Edge portions of the upper surface 122 of the arm 118 (FIG. 10) include indents 124 for engaging end portions of the slat 108.

Figure 18:
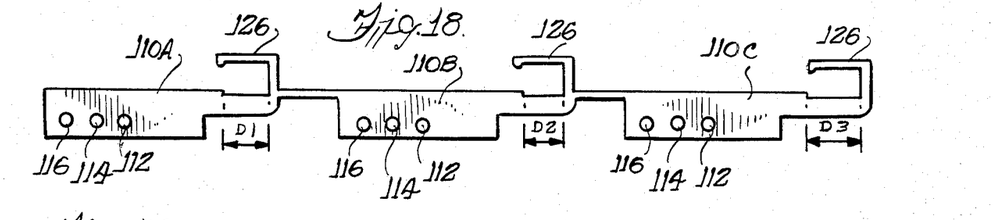
FIG. 18 is a side view of three preferred varieties of the support presented in FIG. 15.

The support 110 is U-shaped in cross section (FIG. 16) for receiving the end of the arm 118 having the pins 120. The pins 120 are snap engageable with the apertures 112, 114 or 116 of the support 110. The support 110 includes a hooked portion 126 (FIG. 15) which is preferably snap engageable with the molding 83 of the window 82. It has been noted that molding dimensions vary appreciably from one van manufacturer to another. It has further been noted, however, that three preferred embodiments 110A, 110B and 110C (FIG. 18) of the support 110 will be snap engageable with most commercially-available window moldings 83. All that varies as between the embodiments 110A, 110B or 110C of the support is a longitudinal dimension of the hooked portion 126. Such longitudinal dimensions, presented in FIG. 18, are D1 for 110A, D2 for 110B and D3 for 110C. D1 is preferably from about 10 to about 10½ millimeters. D2 is preferably from about 9½ to about 10 millimeters. D3 is preferably from about 11½ to about 12 millimeters.

The support 110 further includes a through aperture 128 (FIG. 17) through a sidewall of the hooked portion 126 and disposed transverse to the apertures 112, 114 and 116 for securing the support 110 to the window molding 83, when the window molding 83 does not snap engage with the preferred embodiment of the support 110A, 110B or 110C. A preferred manner of securing the support 110 to such a window molding 83 is with a metal screw 130 (FIG. 22).

Figure 2:
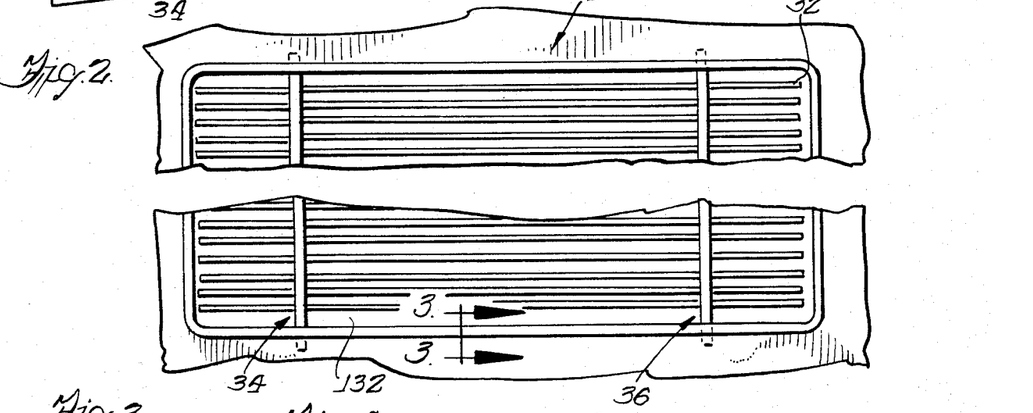
FIG. 2 is a fragmented frontal view of another embodiment of the present invention secured to another type of vehicular window.

The second embodiment of the window blind 30B is shown secured to a fixed window 132 (FIG. 2).

Figure 3:
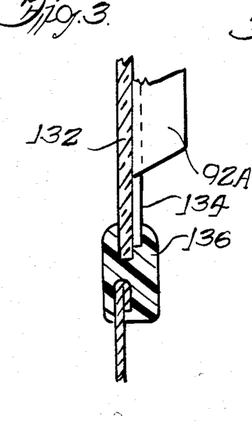
FIG. 3 is a side partial view, in section and on an enlarged scale, taken along the lines 3—3 in FIG. 2, illustrating engagement of a portion of the window blind with the window.

The endpiece 92 can have the hooked portion 106 removed, such as by cutting or otherwise, thereby providing an endpiece 92A having an integral finger 134 (FIG. 13). If desired, the finger 134 can be similarly removed for providing yet another embodiment of the endpiece 92B (FIG. 14). It has been noted that most fixed windows 132 are surrounded by a resilient gasket 136 which is priable, to a degree, away from the window 132 (FIG. 3). The thickness of the finger 134 is preferably such that the finger 134 is snugly insertable intermediate the window 132 and the gasket 136 for securing the end piece 92A to the window 132 (FIG. 3). It can be appreciated that endpiece 92A (of the second embodiment of the window blind 30B) are vertically alignable along the window 132 (FIG. 2), much the same way as were the endpieces 92 (of the first embodiment) relative to the window 82 (FIG. 1). With the first sidepiece 38 having a length sufficient for providing snug engagement of the first sidepiece 38 with the window 132, the first sidepiece 38 is then snap engaged with the endpiece 92A.

In addition to being snap engageable, the above-described parts are readily disengageable to provide for easy disassembly of the first or second embodiments of the window blind 30A or 30B.

It is also to be noted that virtually all of the above-described elements (except, perhaps, for the slats 32, bolts 62, nuts 64, slats 108 and metal screws 130, all of which are preferably made of metal) are preferably made from a high-impact, resilient, commercially-available plastic, and that such plastic is preferably injection moldable, whereby the parts can be formed in an integral manner (FIG. 18) for ease of handling or for other reasons.

What has been illustrated and described herein is a novel window blind. While the window blind of the present invention has been illustrated and described with reference to several preferred embodiments, the invention is not limited thereto. On the contrary, alternatives, changes or modifications may become apparent to those skilled in the art upon reading the foregoing description. Accordingly, such alternatives, changes or modifications are to be considered as forming a part of the invention insofar as they fall within the spirit and scope of the appended claims.

The invention is claimed as follows:

1. A window blind for assembly with a vehicle window in a window opening and presenting upper and lower edge portions comprising: a plurality of slats, first and second upstanding spaced apart framework members respectively including first and second upstanding spaced apart elongated members and a plurality of slat supporting struts extending between said first and second elongated members, a plurality of pivotal connecting means pivotally connecting opposite ends of said struts respectively to said first and second elongated members, and a plurality of upper and lower securement means respectively connected to upper and lower ends of said first elongated members for securing said first elongated members in fixed relationship to said window, said slats respectively being supported at opposite end portion locations spaced inwardly from terminal ends thereof by an associated strut, each of said struts including upwardly facing edge means extending substantially between the associated first and second elongated members and supporting said slats, said second elongated members being unsupported except for the pivotal connections with the struts and projecting forwardly of the struts so that they may be manually manipulated up and down for adjusting the position of the slats, at least one of the pivotal connecting means connecting the struts to the elongated members resisting pivotal movement sufficiently to prevent adjustment of the slats in the absence of manual manipulation of one of said elongated members.

2. A window blind as defined in claim 1, wherein said first and second elongated members are oppositely facing U-shaped channel members respectively embracing opposite sides of said opposite ends of the struts, said securing means comprising a U-shaped channel portion for embracibly receiving an end portion of one of the elongated channel members, and complementary inter engaging aperture means and pin means on said securement means channel portion and the elongated channel member end portion for fixing the securement means with respect to the elongated channel member.

3. A window blind, as defined in claim 2 wherein said upper securement means include hook portions for extending around upper margins of the window.

4. A window blind as defined in claim 1, wherein said first and second elongated members are U-shaped channel members embracing opposite sides of said opposite ends of the struts, and said one pivotal connecting means causes the U-shaped channel member associated therewith to frictionally grip an associated slat for resisting pivotal movement.

5. A window blind as defined in claim 4 wherein said one pivotal connecting means comprises a bolt extending through the associated U-shaped member and strut and a finger operable knob for selectively adjusting the bolt.

6. A window blind for assembly with a vehicle window presenting upper and lower edge portions comprising: a plurality of slats, first and second upstanding spaced apart framework members respectively including pairs of first and second upstanding spaced apart elongated members and a plurality of slat supporting struts extending between said pairs of elongated members, said first elongated members comprising U-shaped channel members embracing opposite sides of associated struts, a plurality of pivotal connecting means pivotally connecting opposite ends of said struts respectively to said first and second elongated members, and a plurality of upper and lower securement means respectively connected to upper and lower ends of said first elongated members for securing said first elongated members in fixed relationship to said window, said second elongated members being unsupported except for the pivotal connections with said struts and being located so that they may be manually manipulated for adjusting the position of the slats, each of said securing means comprising a U-shaped channel portion for embraceably receiving an end portion of the elongated channel member associated therewith, and complementary interengageable aperture and pin means on said securement means channel portion and said elongated channel member end portion for fixing the securement means with respect to the elongated channel member.

7. A window blind as defined in claim 6 wherein at least certain of said securement means comprise a hook portion for engagement around an edge portion of the window.

* * * * *